(12) United States Patent
Gallagher et al.

(10) Patent No.: US 7,280,703 B2
(45) Date of Patent: Oct. 9, 2007

(54) METHOD OF SPATIALLY FILTERING A DIGITAL IMAGE USING CHROMINANCE INFORMATION

(75) Inventors: Andrew C. Gallagher, Brockport, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1098 days.

(21) Appl. No.: 10/294,860

(22) Filed: Nov. 14, 2002

(65) Prior Publication Data

US 2004/0096103 A1      May 20, 2004

(51) Int. Cl.
   *G06K 9/40*      (2006.01)
   *G06K 9/00*      (2006.01)
(52) U.S. Cl. ..................................... 382/260
(58) Field of Classification Search ............... 382/162, 382/167, 254, 302, 260–265; 358/1.9, 3.01, 358/515, 518, 527, 530; 345/600–604; 348/578
See application file for complete search history.

(56) References Cited

U.S. PATENT DOCUMENTS

| | | | |
|---|---|---|---|
| 5,012,333 A | 4/1991 | Lee et al. | |
| 5,227,863 A * | 7/1993 | Bilbrey et al. | 348/578 |
| 5,454,044 A | 9/1995 | Nakajima | |
| 5,467,404 A | 11/1995 | Vuylsteke et al. | |
| 5,471,987 A | 12/1995 | Nakazawa et al. | |
| 5,682,443 A | 10/1997 | Gouch et al. | |
| 5,717,791 A | 2/1998 | Labaere et al. | |
| 5,796,870 A | 8/1998 | Takeo | |
| 5,805,721 A | 9/1998 | Vuylsteke et al. | |
| 5,905,817 A | 5/1999 | Matama | |
| 5,907,642 A | 5/1999 | Ito | |
| 5,991,457 A | 11/1999 | Ito et al. | |
| 6,167,165 A * | 12/2000 | Gallagher et al. | 382/263 |
| 6,285,798 B1 | 9/2001 | Lee | |
| 6,317,521 B1 * | 11/2001 | Gallagher et al. | 382/260 |
| 6,438,264 B1 | 8/2002 | Gallagher et al. | |

OTHER PUBLICATIONS

Burt et al., "The Laplacian Pyramid as a Compact Image Code," *IEEE Transactions on Communications*, vol. Com-31, No. 4, Apr. 1983, pp. 532-540.
U.S. Appl. No. 09/457,036, filed by Gallagher, Dec. 8, 1999.

* cited by examiner

*Primary Examiner*—Amir Alavi
(74) *Attorney, Agent, or Firm*—Thomas H. Chose

(57) ABSTRACT

A method of processing a color digital image having a luminance channel and one or more chrominance channels to improve the tone scale characteristics of the image, includes the steps of: producing a control signal from the one or more chrominance channels; generating a pedestal signal containing mainly low frequency modulation by filtering the luminance channel with a spatial filter, whereby the operation of the spatial filter is modulated by the control signal; and producing a texture signal by subtracting the pedestal signal from the luminance channel.

20 Claims, 11 Drawing Sheets

METHOD OF SPATIALLY FILTERING A DIGITAL IMAGE USING CHROMINANCE INFORMATION

FIELD OF INVENTION

The present invention relates to an improved method of spatially filtering digital images.

BACKGROUND OF THE INVENTION

It is well known that the dynamic range of an image captured with an image capture device (such as a photographic negative) is often greater than the dynamic range of the output medium (such as a photographic paper or CRT monitor). The result of this incongruity is that a good deal of scene content is rendered to black or white on the output image. For this reason, in an image processing environment, a tone scale function may be used to reduce the scene dynamic range in order to map more information onto the output medium, in a process called dynamic range modification or dynamic range compression. The dynamic range compression modifies the tone scale characteristics of the image.

There exist many processes for creating a tone scale function on an image dependent basis (e.g. see U.S. Pat. No. 5,471,987, issued Dec. 5, 1995 to Nakazawa et al.). Each of the conventional tone scale function processes examines certain statistical characteristics of the image under consideration in order to automatically generate the tone scale function. In addition, the tone scale function may be generated with manual interactive tools by a human operator.

After the tone scale function has been generated, there exists the question of how to apply the tone scale function to the digital image. The goal of dynamic range compression is to adjust the overall dynamic range of the image, rather than to affect the contrast of any given object in the image. In essence, tone scale function should be applied to an image in such a way as to minimize the effect to the scene texture. To that end, it is known to apply the tone scale function to a low frequency sub-band of the image, preserving the higher frequency sub-band(s) that are considered image texture (e.g. see U.S. Pat. No. 5,012,333, issued Apr. 30, 1991 to Lee et al.).

In U.S. Pat. No. 5,012,333, Lee describes a procedure for preserving the high frequency detail of an image by blurring the image neutral channel in order to create a low-pass signal. Subtracting the low-pass signal from the image neutral channel produces a high-pass signal. The processed image is generated by applying the tone scale function to the low-pass signal and adding the result to the high-pass signal. This procedure preserves a segment of the image frequency spectrum, however, artifacts are seen at object boundaries in the image. Gallagher and Gindele build on this work; see U.S. Pat. No. 6,317,521, issued Nov. 13, 2001. More specifically, Gallagher et al. incorporates an artifact avoidance scheme along with a single standard FIR filter to generate the texture signal. While this improvement reduces the occurrence of artifacts in the final image, the artifacts can still be visible.

Also, in U.S. Pat. No. 5,454,044, issued Sep. 26, 1995, Nakajima suggests modifying the image contrast by a formula Sproc=Sorg+f(Sus), where Sproc is the processed image; Sorg is the original image; and f(Sus) is a monotonic function of the unsharp image Sus. In U.S. Pat. No. 5,905,817, issued May 18, 1999, Matama describes using an IIR filter in essentially the same framework as Lee. The advantage of this approach is a reduction in the computational resource requirements.

Each of these methods of applying a tone scale function to an image channel relies on a single blurring with a linear filter. Because of this, there is an inherent size selectivity property in the tone scale function application process. Image structures that are spatially smaller than a certain size are preserved, while details larger than that size are affected by the tone scale function. In addition, the preservation of high frequencies in the image may lead to the creation of unsharp mask type artifacts (overshoot and undershoot) in the neighborhood of large image edges (characteristic of large occlusion boundaries or dark shadows.) In general, it was observed that larger digital filters (used to create the low-pass signal) result in a more pleasing processed image, except for the fact that the artifacts may become more objectionable.

Another approach to the problem of dynamic range modification is to use nonlinear filtering techniques that essentially preserve edges but blur out detail. In U.S. Pat. No. 5,796,870, issued Aug. 18, 1998, Takeo describes a large, rectangular filter, long in the direction along an edge and short in the direction across the edge. This approach reduces the artifacts at edges, but diagonal edges pose a problem. Further, Nakazawa et al. in U.S. Pat. No. 5,471,987, referenced above, describe using an FIR filter whose weights are determined at each pixel location, based on the absolute value of the differences of pixel intensities between two pixels falling under the digital filter. Finally, Gallagher describes (in U.S. Ser. No. 09/457,036, filed Dec. 8, 1999) an adaptive recursive filter having means to adaptively avoid blurring across edge boundaries. These methods are rather time consuming. In addition, it has been found that optimal dynamic range modification cannot be realized by sensing edges at only a single resolution of the image.

Several authors have introduced methods for achieving dynamic range modification of an image by decomposing the image into multiple resolutions. For example, in U.S. Pat. No. 5,467,404, issued Nov. 14, 1995, and U.S. Pat. No. 5,805,721 issued Sep. 8, 1988, Vuylsteke et al. teach a method of decomposing an image into multiple resolutions and using a pre-determined nonlinear amplitude compression function for the high frequency component in each resolution. A deficiency of this method is that the amplitude at each resolution does not adequately identify whether the signal is part of a large amplitude edge or an image texture. A similar invention was disclosed in U.S. Pat. No. 5,717,791, issued Feb. 10, 1998 to Labaere et al., which describes a similar dynamic range compression scheme using wavelet filters to generate the multiple resolutions.

In U.S. Pat. No. 5,907,642, issued May 25, 1999, Ito describes a method of image enhancement based on processing the detail signals of a multiple resolution image representation. Ito describes suppressing the magnitude of detail signals in situations where the next lower detail signal has small magnitude. In U.S. Pat. No. 5,991,457, issued Nov. 23, 1999, Ito et al. describe a method of generating several band pass detail image signals that are modified by application of non-linear functions to modify the dynamic range of the image.

In U.S. Pat. No. 6,285,798 B1, issued Sep. 4, 2001, Lee describes yet another dynamic range compression method using a multiple resolution representation of an image. Lee describes a method of using wavelet filters to create a plurality of coarse signals and detail signals, modifying the detail signals in accordance with contrast gain signals created by detecting the edges of the coarse scale edges, and adding the modified detail signals to the coarse signals to obtain an output image.

In each of these dynamic range compression techniques using multiple image resolutions, the high frequency (or edge or band pass) components of the multiple resolution representation are modified to affect the image dynamic range. However, it is often inconvenient to operate on the high frequency component of the multiple image resolution. In addition, the characteristics of the high frequency signals vary as a function of the level within the multiple image representation of the image. This variability requires a complicated parameter tuning in order to achieve optimal dynamic range compression without producing objectionable artifacts (such as the aforementioned overshoot and undershoot artifact) using a multiple image resolution representation of the image.

Multiresolution, or pyramid methods as a means of representing images as a function of spatial resolution for image processing, has a long history. Burt and Adelson, described a method of representing a digital image by a series of residual images and a base digital image in their journal article "The Laplacian Pyramid as a Compact Image Code" IEEE Transactions on Communications, Vol. Com-31, No. 4, April 1983. However the method taught by Burt et al. was designed for image compression applications and cannot be used for enhancing the tone scale of a digital image.

The prior art methods of dynamic range compression realize that the characteristics of the filter should vary in accordance with the edges of the image. Dynamic range compression is generally applied to only the luminance channel of an image having a luminance channel and one or more chrominance channels. However, because dynamic range compression is generally applied to the luminance channel of a luminance-chrominance image representation, the edges are determined from only the luminance image channel. Thus, the prior art methods sometimes fail when the edges cannot adequately be determined by the luminance channel of an image alone.

In U.S. Pat. No. 5,682,443, issued Oct. 28, 1997, Gouch et al. describe a method of sharpening an image whereby the fringe data is amplified by a value that is determined by color. The method is not used to modify the tone scale characteristics of the image, just the sharpness. In addition, the color information is not used to aid the filtering process when constructing the original fringe data.

There is a need therefore for an improved method of color digital image processing that improves the tone scale of the image and that avoids the problems noted above.

SUMMARY OF THE INVENTION

The need is met according to the present invention by providing a method of processing a color digital image having a luminance channel and one or more chrominance channels to improve the tone scale characteristics of the image that includes the steps of: producing a control signal from the one or more chrominance channels; generating a pedestal signal containing mainly low frequency modulation by filtering the luminance channel with a spatial filter, whereby the operation of the spatial filter is modulated by the control signal; and producing a texture signal by subtracting the pedestal signal from the luminance channel.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
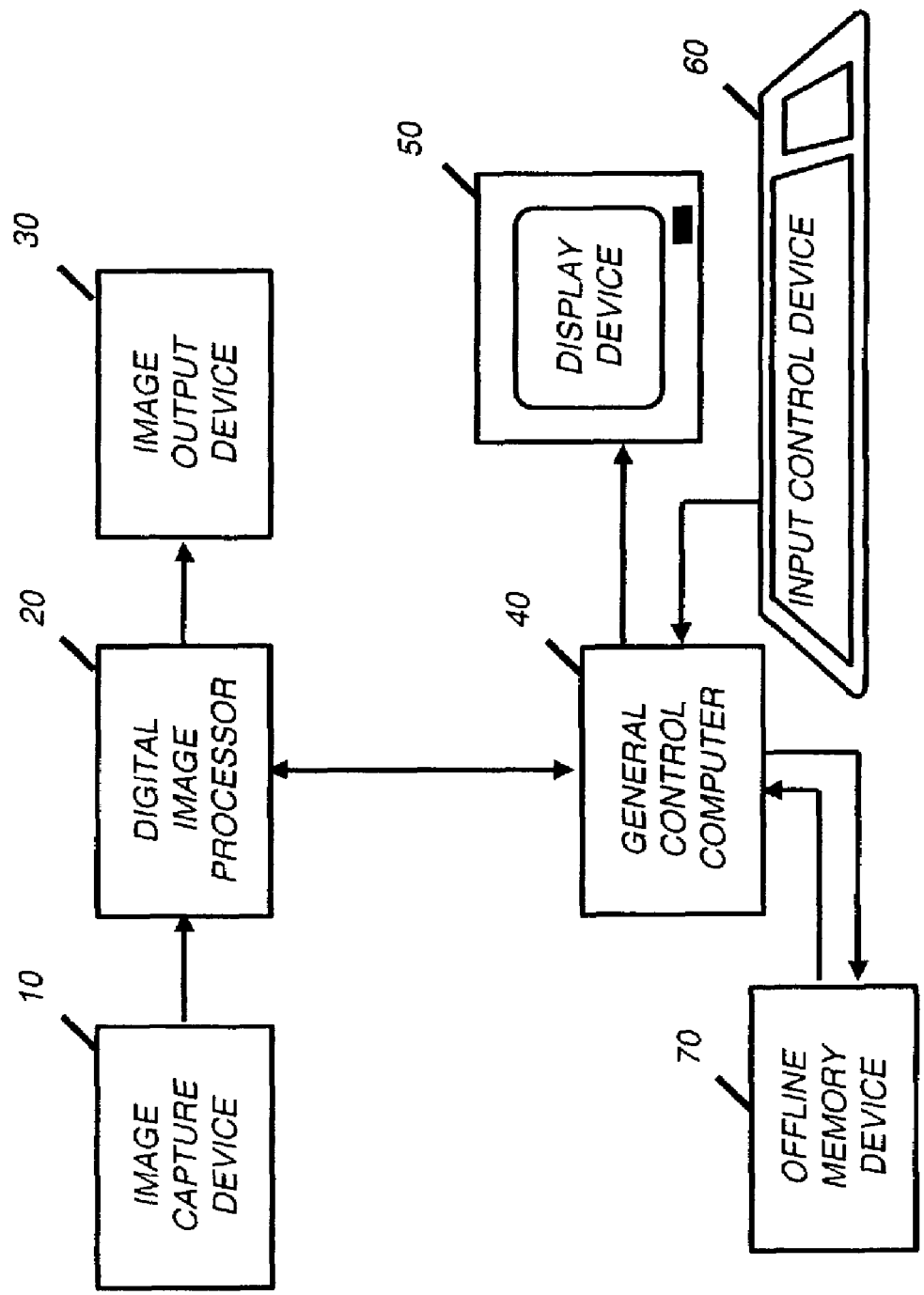
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; and solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values, is functionally equivalent to describing the same processing steps as generating a new digital image with the processed pixel values while retaining the original pixel values.

There are many different types of tone scale functions that can be applied to digital images for enhancement purposes. Some digital images are derived from original scenes photographed that have a high dynamic range of intensities present. In general, it is difficult to make pleasing prints from these high dynamic range digital images since the range of pixel values is so large. For a typical high dynamic range digital image, the image content in the highlight regions (bright portions) and shadow regions (dark portions) will often be rendered without detail since photographic paper can only reproduce faithfully a limited range of intensities. Therefore, a compressive tone scale function, i.e. a tone scale function designed to compress, or reduce, the dynamic range of a digital image, can be applied to a high dynamic range digital image to reduce the numerical range of pixel values. This processed digital image when printed will reproduce more spatial detail in the highlight and shadow regions than if the tone scale function had not been applied. Unfortunately, the application of a compressive tone scale function can also compress, or reduce the magnitude of, the fine spatial detail of the image content. Therefore, the processed images with the direct application of a tone scale function can result in dull uninteresting images.

The preferred embodiment of the present invention uses a spatial filter to apply a tone scale function to a digital image. The spatial filter is used to separate an original digital image into first and second signals—a pedestal signal and a texture signal. The texture signal contains image content that relates to edges and fine spatial detail. A tone scale function is applied to the pedestal signal. Since the pedestal signal does not contain fine spatial detail, but rather low frequency smoothly varying regions and edges from illumination changes, the application of the tone scale function to the pedestal signal does not reduce the magnitude of the fine spatial detail. The fine spatial detail is preserved in the texture signal, which is recombined with the processed pedestal part. The resulting process achieves the goal of reducing the overall dynamic range of the image to be within the printable range for the photographic paper (or other output medium, such as a CRT monitor) but doesn't reduce the magnitude of fine detail in the processed image. The improvement of the present invention comprises employing one or more of the chrominance channels to separate the luminance channel into the first and second signals.

Figure 2:
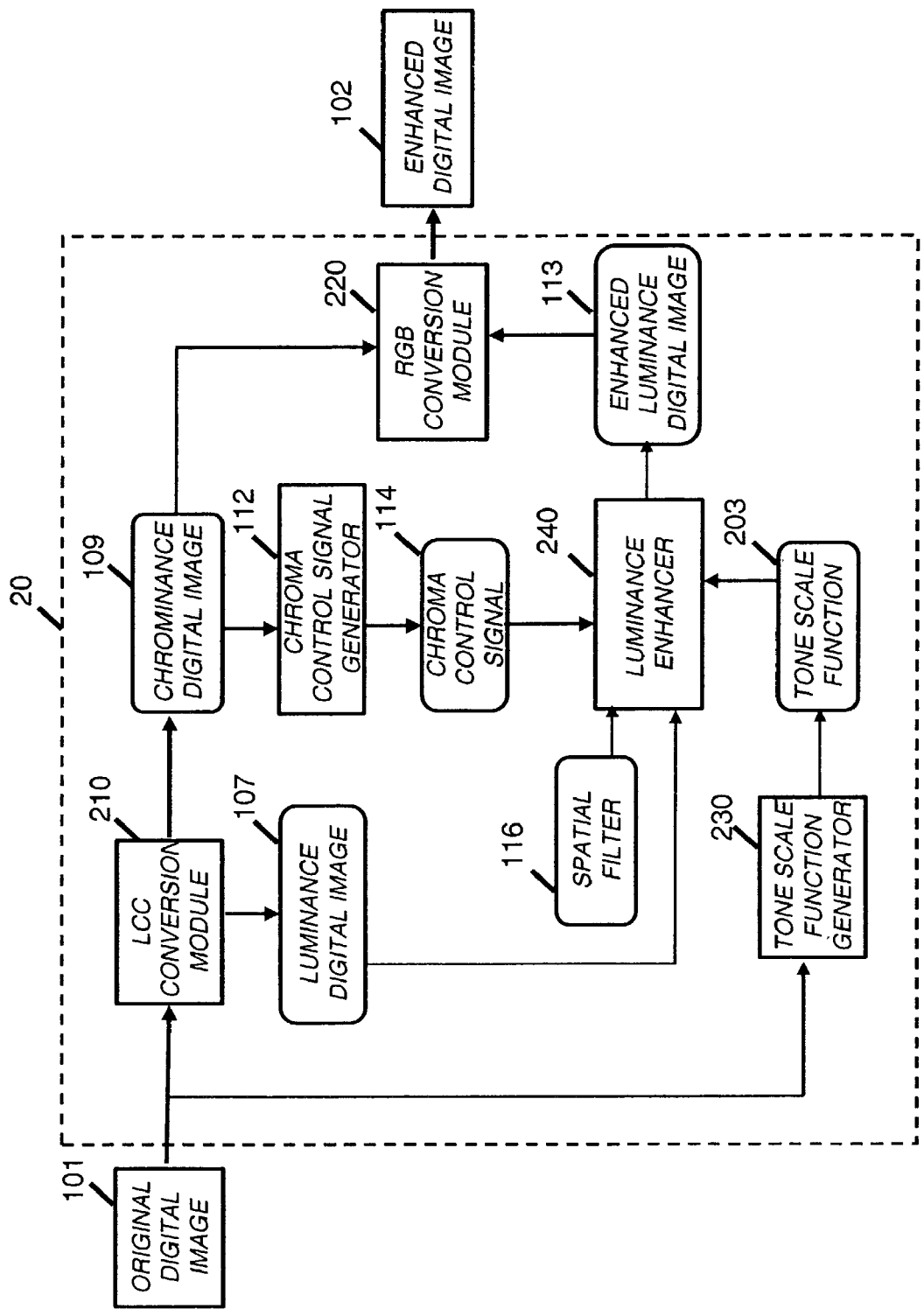
FIG. 2 is a block diagram of the digital image processor of FIG. 1 according to the present invention.

The digital image processor 20 shown in FIG. 1 and programmed to perform the method of the present invention is illustrated in more detail in FIG. 2. An original digital image 101 can be received from the image capture device (shown in FIG. 1) in a variety of different color representations. However, the most typical implementation of the present invention receives the original digital image as a color digital image with red, green, and blue digital image channels. Preferably, the pixel values of the original digital image are related to the log of the scene intensity and each pixel value of each color channel is represented as a 12-bit value. Preferably, every 188 code values represents a doubling of scene intensity (i.e. a photographic stop). For example, a first pixel having a value of 1688 represents a scene intensity that is twice as great as a second pixel having a value of 1500. The present invention can operate successfully with other encodings, although modification to equation constants and shapes of functions may be required. An LCC conversion module 210 receives the original digital image 101 and generates a luminance digital image 107 (containing luminance information in a single digital image channel) and a chrominance digital image 109 (containing the color information in two color-difference digital image channels). The luminance digital image 107 is input to the luminance enhancer 240 for the purpose of creating an enhanced luminance digital image 113. The chrominance digital image 109 is input to the chroma control signal generator 112 for the purpose of creating a chroma control signal 114, which will be used to modify the effect of a spatial filter 116 within the luminance enhancer 240. The tone scale generator 230 inputs the original digital image 101 and analyzes the image, outputting a tone scale function 203 that is used by the luminance enhancer to improve the tone scale of the digital image. The chrominance digital image 109 and enhanced luminance digital image 113 are received by the RGB conversion module 220 which performs a color transformation and generates the enhanced digital image 102 (containing red, green, and blue digital image channels) which is in the same color representation as the original digital image 101. Notice that the enhanced luminance digital image 113 is produced from the chroma control signal 114, a spatial filter 116, the luminance digital image 107, and the tone scale function 203.

The LCC module 210 shown in FIG. 2 preferably employs a 3 element by 3 element matrix transformation to convert the red, green, and blue pixel values of the original digital image 101 into luminance and chrominance pixel values. Let R(x,y), G(x,y), and B(x,y) refer to the pixel values corresponding to the red, green, and blue digital image channels located at the $x^{th}$ row and $y^{th}$ column. Let L(x,y), GM(x,y), and ILL(x,y) refer to the transformed luminance, first chrominance, and second chrominance pixel values respectively of an LCC original digital image. The 3 element by 3 elements of the matrix transformation are described by (1).

$$L(x,y)=0.333\ R(x,y)+0.333\ G(x,y)+0.333\ B(x,y) \quad (1)$$

$$GM(x,y)=-0.25\ R(x,y)+0.50\ G(x,y)-0.25\ B(x,y)$$

$$ILL(x,y)=-0.50\ R(x,y)+0.50\ B(x,y) \quad (1)$$

Those skilled in the art will recognize that the exact values used for coefficients in the luminance/chrominance matrix transformation may be altered and still yield substantially the same effect. An alternative also used in the art is described by (2).

$$L(x,y)=0.375\ R(x,y)+0.500\ G(x,y)+0.125\ B(x,y) \quad (2)$$

$$GM(x,y)=-0.250\ R(x,y)+0.500\ G(x,y)-0.250\ B(x,y)$$

$$ILL(x,y)=-0.500\ R(x,y)+0.50\ B(x,y) \quad (2)$$

The collection of luminance pixel values is the single-channel luminance digital image. The chrominance digital image has two channels, the green-magenta channel (whose values are GM(x,y)) and the illuminant channel (whose values are ILL(x,y)). The luminance digital image is made up of luminance pixel values and the chrominance digital image is made up of chrominance pixel values.

The RGB conversion module 220 shown in FIG. 2 employs a 3 element by 3 element matrix transformation to convert the luminance and chrominance pixel values into red, green, and blue pixel values by performing the inverse matrix operation to the LCC module 210. The matrix elements of the RGB module are given by (3).

$$R(x,y)=L(x,y)-0.666\ GM(x,y)-ILL(x,y) \quad (3)$$

$$G(x,y)=L(x,y)+1.333\ GM(x,y)$$

$$B(x,y)=L(x,y)-0.666\ GM(x,y)+ILL(x,y) \quad (3)$$

The spatial filter 116 of FIG. 2 is a digital convolution filter having fixed coefficients. As will be described in detail hereinbelow, the luminance enhancer 240 applies the spatial filter 116 to the luminance digital image 107 according to the chroma control signal 114 in such a manner that the effect of the filter's application is non-linear. That is, the coefficients of the spatial filter 116 remain fixed, yet the application of the filter is non-linear because of the chroma control signal 114.

Preferably, the spatial filter 116 is a Gaussian lowpass filter. This Gaussian filter is a two-dimensional, circularly symmetric, low-pass filter whose filter coefficients may be derived by the following formula that is well known in the art:

$$b(i,j) = \frac{1}{\sigma\sqrt{2\pi}}\exp\left[\frac{-(i^2+j^2)}{2\sigma^2}\right] \quad (4)$$

where:
b(i,j)=the Gaussian filter coefficient at the $(i,j)^{th}$ pixel
σ=the standard deviation of the Gaussian filter
π=the constant approximately 3.14159265 . . .

For example, if the spatial filter 116 is a 5 by 5 pixel filter made with σ=1, the filter coefficients are as follows:
[0.003 0.0133 0.0219 0.0133 0.003 0.0133 0.0596 0.0983 0.0596 0.0133 0.0219 0.0983 0.162 0.0983 0.0219 0.0133 0.0596 0.0983 0.0596 0.0133 0.003 0.0133 0.0219 0.0133 0.003])

Those skilled in the art will also recognize that the Gaussian lowpass filter is separable into a horizontal component and a vertical component, which reduces the computational complexity.

The tone scale function generator 230 (shown in FIG. 2) preferably generates the tone scale function by an analysis of the original digital image 101. Preferably the tone scale function generator 230 incorporates the method described by Lee et al. in U.S. Pat. No. 5,822,453 to calculate and output the tone scale function 203.

The present invention can also be used with tone scale functions that are not derived from an analysis of the original digital image 101, i.e. scene independent tone scale functions. For example, a linear tone scale function constructed as $T_5(x)=0.6(x-x_r)+x_r$ has been implemented and used as the tone scale function 203 yielding excellent image enhancement results. This tone scale function achieves a dynamic range compression effect due the linear equation having a slope of less than 1.0.

Figure 3:
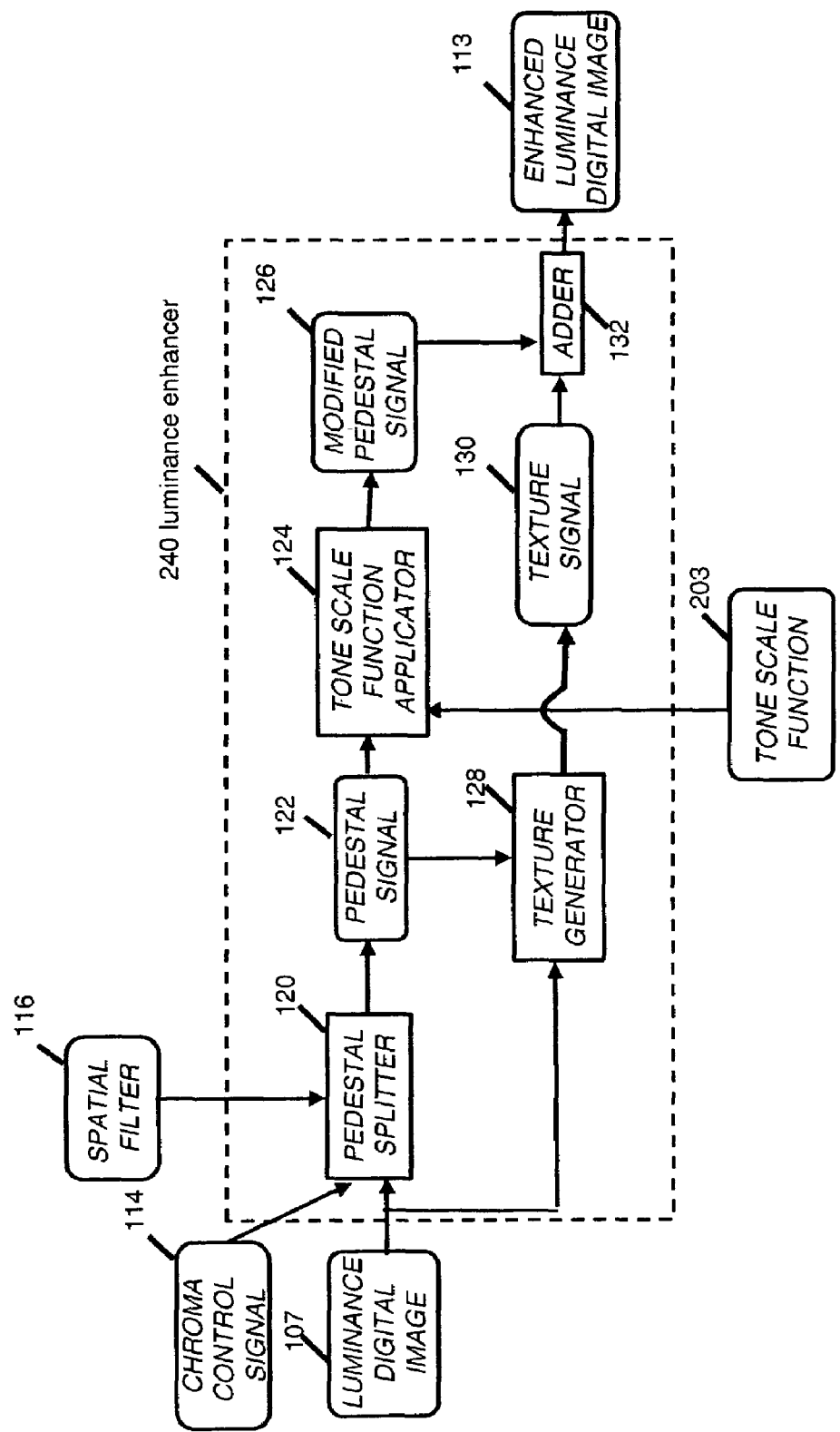
FIG. 3 is a block diagram of the luminance enhancer shown in FIG. 2.

The luminance enhancer 240 is illustrated in more detail in FIG. 3. The luminance digital image 107, the spatial filter 116, and the chroma control signal 114 are input to the pedestal splitter 120 for producing a pedestal signal 122. The pedestal signal 122 is essentially identical to the luminance digital image 107, with the exception that image texture is removed (i.e. texture that would be damaged if affected by the tone scale function). Ideally, the pedestal signal 122 is smooth with sharp transitions corresponding to large lighting edges (such as the transition from a bright sky to a backlit mountain, or the edge of a high contrast shadow) in the luminance digital image. Preferably, the pedestal signal p(x,y) is made up of the same number of rows and columns of pixels as the luminance digital image 107. The pedestal splitter 120 and the chroma control signal 114 will be described in greater detail hereinbelow.

The pedestal signal and the luminance digital image are input to a texture generator 128 for producing a texture signal 130. The texture signal contains the image texture whose magnitude will be unaffected by the tone scale function. The texture generator 128 generates the texture signal 130 according to the following equation:

$$t(x,y)=L(x,y)-p(x,y) \quad (5)$$

where:
L(x,y) represents the value of the pixel of the luminance digital image at the (x,y) location.

p(x,y) represents the value of the pedestal signal at the (x,y) location.

t(x,y) represents the value of the texture signal at the (x,y) location.

Note that the sum of the pedestal and the texture signals is the luminance digital image.

The pedestal signal is input to the tone scale function applicator 124, which produces the modified pedestal signal pm(x,y). The tone scale function applicator 124 produces the modified pedestal signal 126 according to the equation:

$$pm(x,y)=T[p(x,y)] \qquad (6)$$

where:

pm(x,y) represents the value of the (x,y) the pixel of the modified pedestal signal pm(x,y).

T[x] represents the value of the tone scale function 203 for an input value of x. Those skilled in the art will recognize that the tone scale applicator 124 simply applies a look-up-table (LUT) to the pedestal signal, producing the modified pedestal signal 126.

The modified pedestal signal 126 and the texture signal 130 are then added by an adder 132, producing the enhanced luminance digital image 113. The adder 132 generates the enhanced luminance digital image simply by summing the pixel values of the texture signal and the modified pedestal signal 126, according to the equation:

$$Le(x,y)=pm(x,y)+t(x,y) \qquad (7)$$

Where:

Le(x,y) represents the value of the pixel of the enhanced luminance digital image 113 at the (x,y) location.

pm(x,y) represents the value of the (x,y) the pixel of the modified pedestal signal 126 pm(x,y).

t(x,y) represents the value of the (x,y) the pixel of the texture signal 130 t(x,y).

Referring again to FIG. 2, the chroma control signal generator 112 receives the input of the chrominance digital image 109 and outputs the chroma control signal 114. The chroma control signal 114 is then used by the luminance enhancer, as shown by FIG. 3, in the creation of the pedestal signal 122. As previously described, the pedestal signal is conceptually smooth, except at locations of lighting edges. Thus, the pedestal splitter 114 is essentially an edge-preserving smoothing filter, which smoothes detail but preserves edges. In practice, however, it can be very difficult to distinguish between "edges" and "detail." Typically, prior art methods employ a means by which the filtering on the luminance digital image varies as a function of a local gradient measure. This works well most of the time, but one failure in particular occurs for original digital images containing a junction between a clear, bright, blue sky, and the darker branches of a tree. Sky areas of different sizes are often visible between the branches of the tree. Some of the sky-tree transitions are considered to be "edges" and others are considered to be "detail". After application of a tone scale function, the sky in the digital image can appear to be non-uniform (i.e. modulating between light blue and dark blue, depending on the proximity of the sky to a non-sky material, such as a tree branch.) The chroma control signal 114 aids the pedestal splitter 120 in order that the pedestal splitter 120 can distinguish between "edge" regions and "detail" regions with greater accuracy and robustness than when not using any information from the chrominance digital image 109 of FIG. 2. Thus, the pedestal splitter 120 of FIG. 3 uses color information, that when combined with the edge-preserving filtering on the luminance digital image alone, provides for a more robust classification of "edge" regions and "detail" regions, resulting in a superior enhanced digital image, specifically having a uniform look to the sky regions.

The chroma control signal generator 112 of FIG. 2 generates the chroma control signal as follows. Recall that the chrominance digital image is made of chrominance channels, specifically the GM and the ILL channels. The chroma control signal is made by simultaneously considering M×M windows of the chrominance channels. For each pixel location of the chroma control signal, corresponding windows of the chrominance channels are considered. The gradient threshold value is determined as a function of the distance between values from the chrominance channels to a target color as follows. A color weight is determined for each pixel location within the window. Preferably, the color weight is such that chrominance values having a smaller distance to a target color (e.g. blue as in blue sky) receive a higher weight than other colors. The color weight is assigned using a 2 dimensional look-up-table (one dimension is GM, and the other dimension is ILL), originally generated by evaluating a two dimensional Gaussian function, as described in U.S. Pat. No. 6,438,264. The color weight of the window is preferably the maximum of the color weights of the pixels belonging to the window.

Next, a chroma edge value for each window is found by considering the variance, or some other measure of the spread of different colors represented within the window and multiplying that by the window's color weight. In equation form, the chroma edge value is preferably found as follows:

$$Ce=Cw*\sigma v \qquad (8)$$

Where:

Ce is the chroma edge value for a pixel having an associated M×M window of pixels Cw is the color weight of the M×M window σv is a measure of the variance of the chrominance values contained in the M×M window. Preferably, $$\sigma v = \frac{1}{M*M}\left[\sum_{m=1}^{M*M} GM_m^2 + \frac{1}{M*M}\left[\sum_{m=1}^{M*M} GM_m\right]^2\left[\sum_{m=1}^{M*M} ILL_m\right]^2 + \sum_{m=1}^{M*M} ILL_m^2\right] \qquad (9)$$

where:

GMn represents the $m^{th}$ green-magenta chrominance value of the M×M values within the M×M window.

ILLn represents the $m^{th}$ illuminant chrominance value of the M×M values within the M×M window.

Preferably, M=2.

Finally, the chroma control value is found by passing the chroma edge value through a LUT. This can be illustrated with the following equation:

$$Cv = \begin{cases} \min(a\sqrt{Ce-b}, d) & \text{when } Ce > b \\ 0 & \text{otherwise} \end{cases} \qquad (10)$$

where:

a is an arbitrary constant, preferably 1.5 b is an arbitrary constant, preferably 175 d is an arbitrary constant, preferably 150.

Cv is the chroma control value for a particular M×M window.

Thus, the chroma control value will be high when the corresponding windows of the chrominance channels contain at least one blue pixel, and the window has a high variance of color. The chroma control value will be zero if the window contains no blue pixels. Additionally, the chroma control value will be zero if the pixels in the window have identical chrominance channel values.

Figure 4:
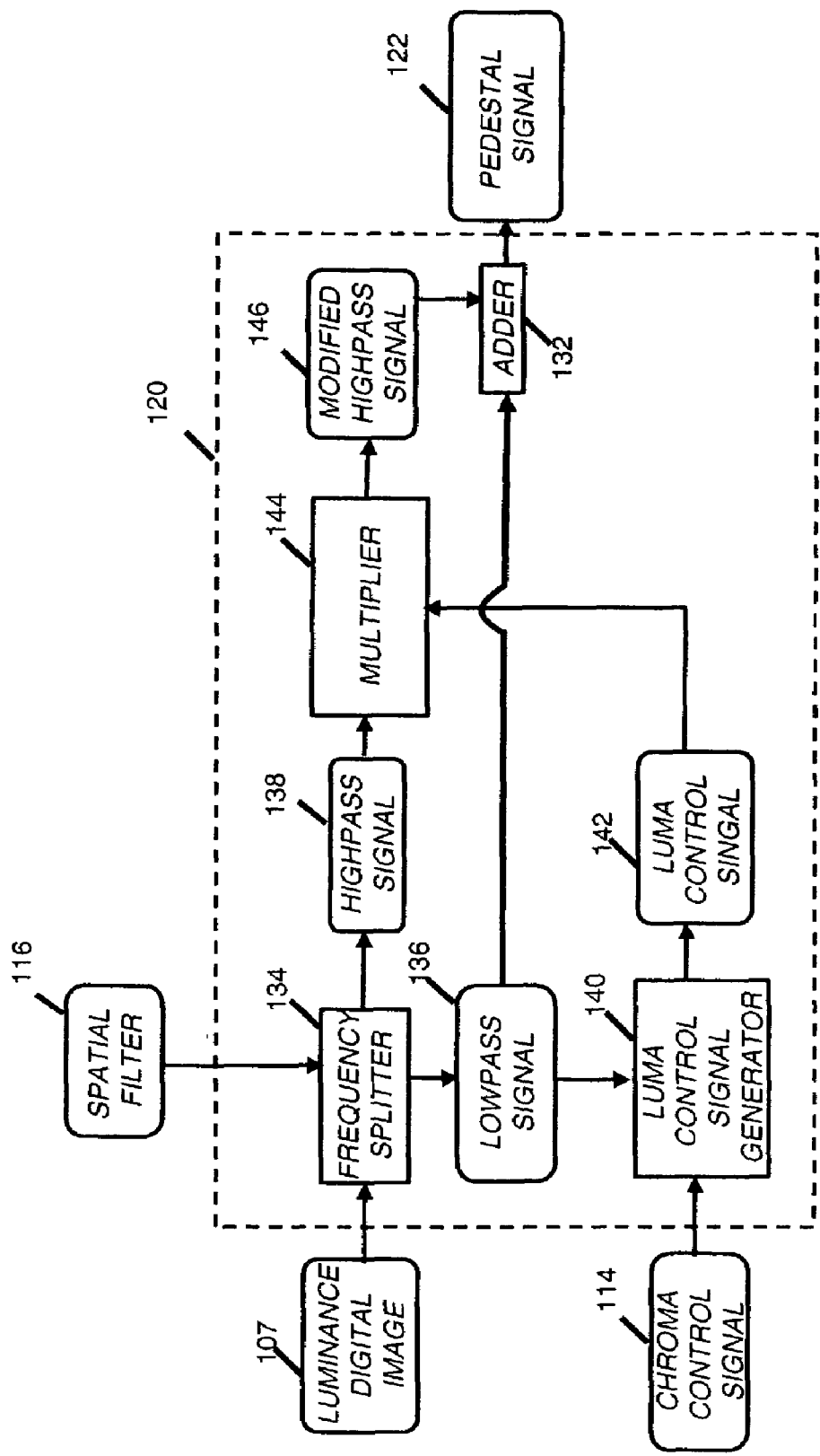
FIG. 4 is a block diagram of the pedestal splitter shown in FIG. 3.

The pedestal splitter 120 shown in FIG. 3, is shown in more detail in FIG. 4. The luminance digital image 107 is input to a frequency splitter 134, along with the spatial filter 116. A lowpass signal 136 is created by convolving the luminance digital image 107 with the spatial filter 116. Convolution is well known in the art. A highpass signal 138 is also produced by the frequency splitter by performing a pixel by pixel difference operation, wherein the lowpass signal is subtracted from the luminance digital image 107.

$$h(x,y)=L(x,y)-l(x,y) \quad (11)$$

where:
L(x,y) represents the value of the pixel of the luminance digital image at the (x,y) location.
l(x,y) represents the value of the lowpass signal at the (x,y) location.
h(x,y) represents the value of the highpass signal at the (x,y) location.

Note that the sum of the pedestal and the highpass signals is the luminance digital image.

The lowpass signal 136 and the chroma control signal 114 are input to the luma control signal generator 140 for generating the luma control signal 142. Alternatively, the luminance digital image or a spatial filtered version of the luminance digital image or the green channel from the original digital image could be input to the luma control signal generator 140 in place of the lowpass signal 136. The luma control signal 142 controls the effect of the spatial filter on the luminance digital image 107.

Figure 5:
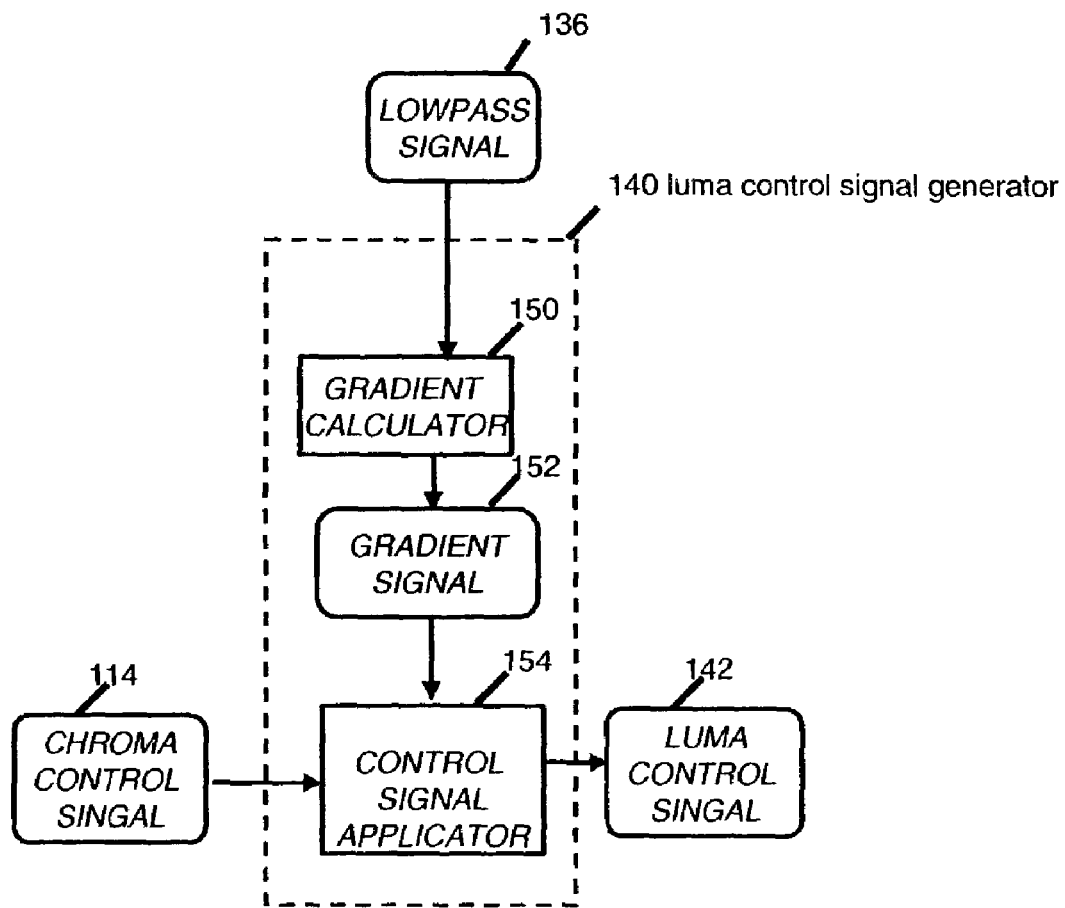
FIG. 5 is a block diagram of a luma control signal generator shown in FIG. 4.

The luma control signal is created as shown in FIG. 5. First, the non-directional gradient G of the lowpass signal 136 is calculated by the gradient calculator 150 and output as the gradient signal 152. This calculation is performed by first calculating vertical and horizontal gradients with a spatial filter called a gradient filter.

Although a variety of different gradient filters can be used, the preferred embodiment of the present invention uses two one-dimensional Prewitt spatial filters to generate a vertical and a horizontal gradient value for each input pixel value given by equation (12) and (13)

$$\begin{matrix} -1 & 0 & 1 \\ -1 & 0 & 1 \\ -1 & 0 & 1 \end{matrix} \quad (12)$$

$$\begin{matrix} -1 & -1 & -1 \\ 0 & 0 & 0 \\ 1 & 1 & 1 \end{matrix} \quad (13)$$

respectively.

The non-directional gradient signal 152 is the square root of the sum of the squares of these two gradients. The control signal applicator 154 inputs both the gradient signal 152 and the chroma control signal 114 and produces the luma control signal 142. The values of the luma control signal 142 are in the range of 0 to 1, and are found by applying a gradient threshold that is dependent on the value of the chroma control signal 114 to the gradient signal 152. The luma control signal 142 has a value of 1.0 corresponding to "edge" regions and a value of 0.0 corresponding to "detail" regions in the original digital image and intermediate values for regions that are not easily classified as "edge" or "detail". Thus, classification of "edge" and "detail" regions in the luma control signal 114 is dependent on the chrominance channels. In the preferred embodiment, a classification of "edge" can be attained more easily (i.e. the gradient signal requirement is lowered) in the luma control signal when the chrominance channels meet certain requirements (e.g. at least one blue pixel and a large variety of colors are represented). The operation of the control signal applicator 154 can be expressed as an equation:

$$Lc(x, y) = \begin{cases} 0 & \text{when} \quad G(x, y) < p \\ 1 & \text{when} \quad G(x, y) > 2p \\ \dfrac{G(x, y) - p}{p} & \text{otherwise} \end{cases} \quad (14)$$

where:
Lc(x,y) is the value of the luma control signal 142 at the (x,y) location.
G(x,y) is the value of the gradient signal 152 at the (x,y) location.
p is a location-dependent threshold that is dependent on the value of the chroma control signal 114 and is preferably:

$$p(x,y)=\max(0, f-Cv(x,y)) \quad (15)$$

where:
f is an arbitrary constant, preferably 68.

Notice that the chroma control signal 114 is derived from the chrominance channels, and the luma control signal is derived from the chroma control signal 114. Therefore, the luma control signal is derived in part from the chroma control signal 114. The highpass signal and the luma control signal 142 are input to a multiplier 144 for generating a modified highpass signal 146 by performing a pixel-by-pixel multiplication, according to the equation:

$$hm(x,y)=h(x,y)*lc(x,y) \quad (16)$$

where:
hm(x,y) represents the value of the modified highpass signal 146 at the (x,y) location.
lc(x,y) represents the value of the luma control signal 142 at the (x,y) location.
h(x,y) represents the value of the highpass signal 138 at the (x,y) location.

Note that the sum of the pedestal and the highpass signals is the luminance digital image.

Finally, the pedestal signal 122 is produced by an adder 132 that inputs the modified highpass signal 146 and the lowpass signal 136 and adds these input signals according to (x,y) location.

It is instructive to notice that the chroma control signal 114 of FIG. 2 has a large value for image pixels corresponding to windows containing blue pixels and a high variance of color. In turn, a high chroma control value results in a more inclusive requirement for luminance gradient to have a value of 1 (i.e. be classified as an edge) in the luma control signal 142 of FIG. 4. In that case, the modified highpass signal 146 value is then similar to the highpass signal 138 value, and the pedestal signal 122 is then similar in value to the luminance digital image 107, while the texture signal 130 value is zero. The pedestal signal 122 of FIG. 3 is then modified by the tone scale function applicator 124 according to the tone scale function 203, compressing the edge.

Stated another way, the chrominance channels of the original digital image are used to locally vary a threshold that is applied to the gradient of the luminance digital image to distinguish "edge" (high gradient) and "detail" (low gradient) regions. The highpass information of the edge regions is affected by the tone scale function, resulting in an image having compressed dynamic range. However, the highpass information of the detail regions is not affected by the tone scale function, so the highpass detail is preserved in these regions. Thus, using the chrominance digital image portion of the original digital image improves the method of application of a tone scale function to a digital image.

Figure 6:
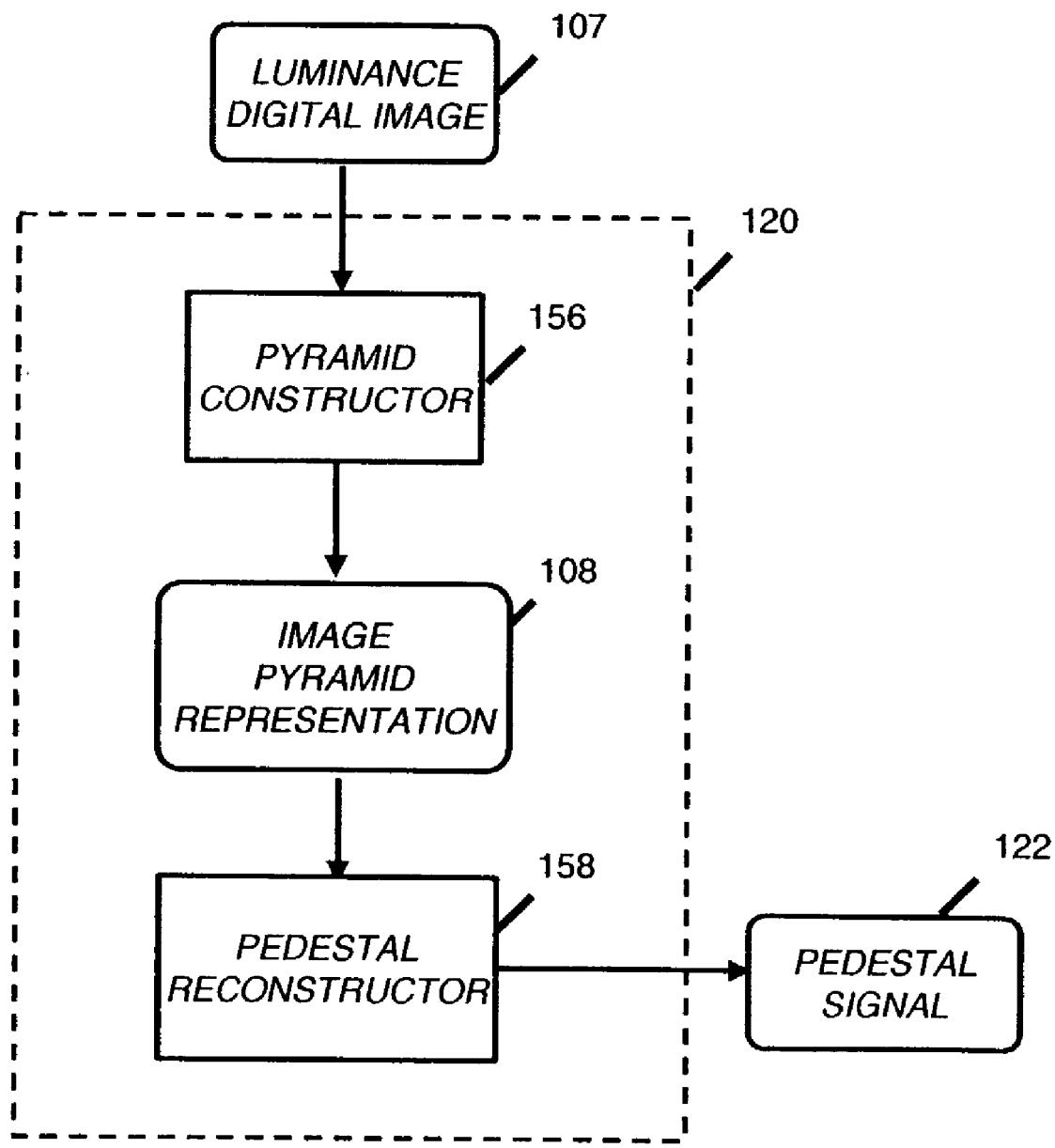
FIG. 6 is a block diagram of the preferred pedestal splitter.

The discussion to this point described the generic method of the present invention. In the discussion to follow, a specific embodiment of the method will be described. The preferred embodiment of the pedestal splitter 120 is shown in FIG. 6, where a pyramid representation of the image is used so that the produced pedestal signal 122 is a result of removing texture information at many different scales. The luminance digital image 107 is input to the pyramid constructor 156, which outputs an image pyramid representation 108. The image pyramid representation 108 contains all of the information that is contained in the luminance digital image 107, and the image pyramid representation 108 can be easily converted back to the luminance digital image 107. The image pyramid representation 108 includes several image signals. The image pyramid representation 108 includes the base digital image, which is essentially a smaller (fewer pixels) version of the luminance digital image 107, and residual images, which contain highpass information from different scales (i.e. the residual images contain bandpass information). The pyramid representation 108 is input to the pedestal reconstructor 158, which combines the image signals of the image pyramid representation 108 in such a manner that the texture information is removed, forming the pedestal signal 122.

Figure 7:
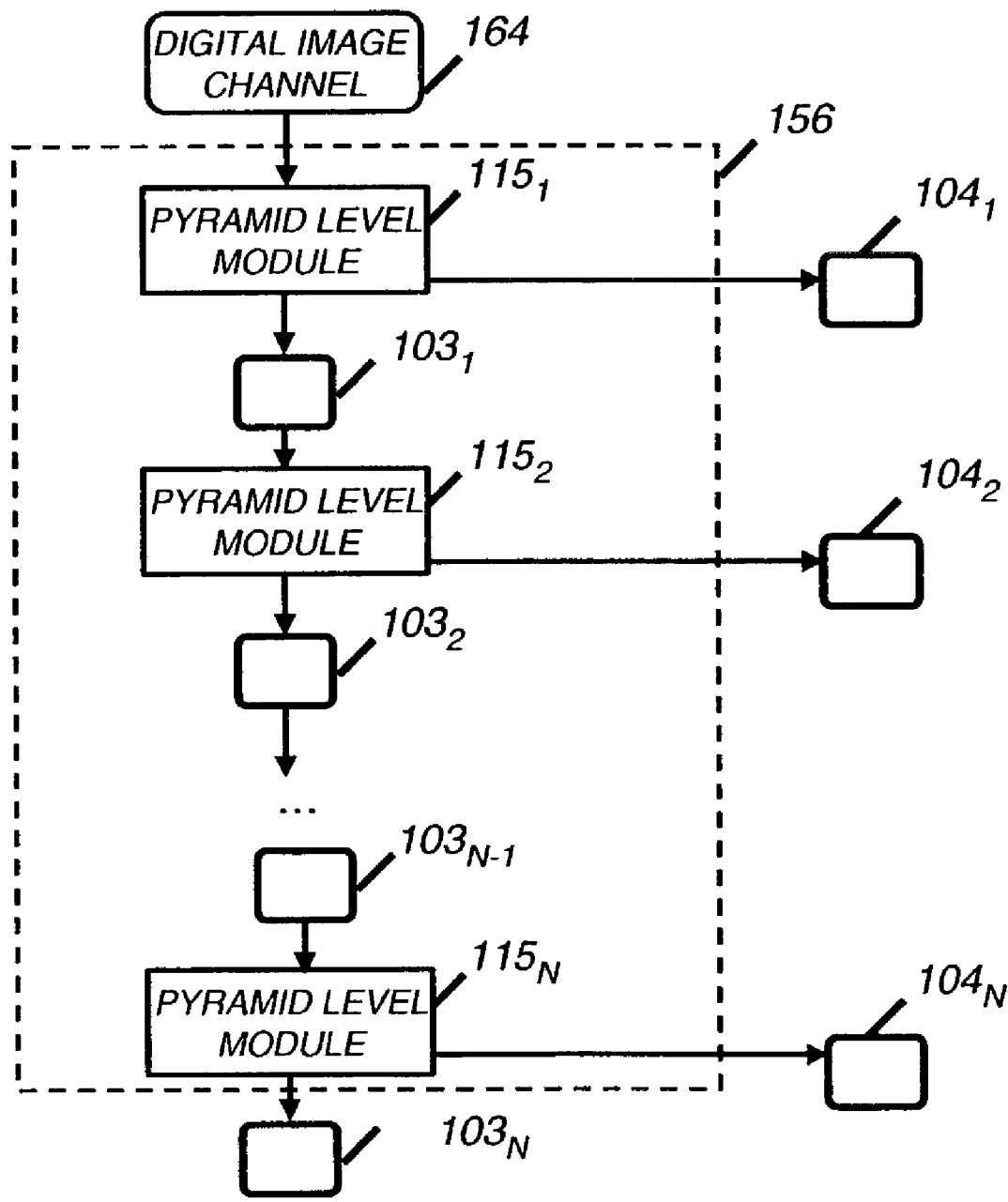
FIG. 7 is a block diagram of the pyramid constructor shown in FIG. 6.

The pyramid constructor 156 is illustrated in more detail in FIG. 7. A digital image channel 164 is input to the pyramid level module $115_1$. The pyramid level module 115 produces a first base digital image $103_1$ and residual digital image $104_1$. The residual digital image has the same number of rows and columns of pixels as the digital image channel 164. The base image channel has 1/Q the number of rows and 1/Q the number of columns of pixels of the digital image channel 164. Preferably Q=2. The base image channel $103_1$ produced by the first pyramid level module $115_1$ is input to the second pyramid level module $115_2$, producing a second base image channel $103_2$ and a second residual image $104_2$. The second base image channel $103_2$ has $1/Q^2$ the number of rows and $1/Q^2$ the number of columns of the digital image channel 164, while the second residual digital image $104_2$ has the same number of rows and columns of pixels as the first base image channel $103_1$. The process iteratively continues N times, when the final pyramid level module $115_N$ inputs the N-1$^{th}$ base image channel and produces the N$^{th}$ base image channel $103_N$ and the N residual digital image $104_N$. The base image channel is a digital image channel, so the pyramid level module always inputs a digital image channel. The digital image channel input to the first pyramid level module can be considered the 0$^{th}$ base image channel.

Figure 8:
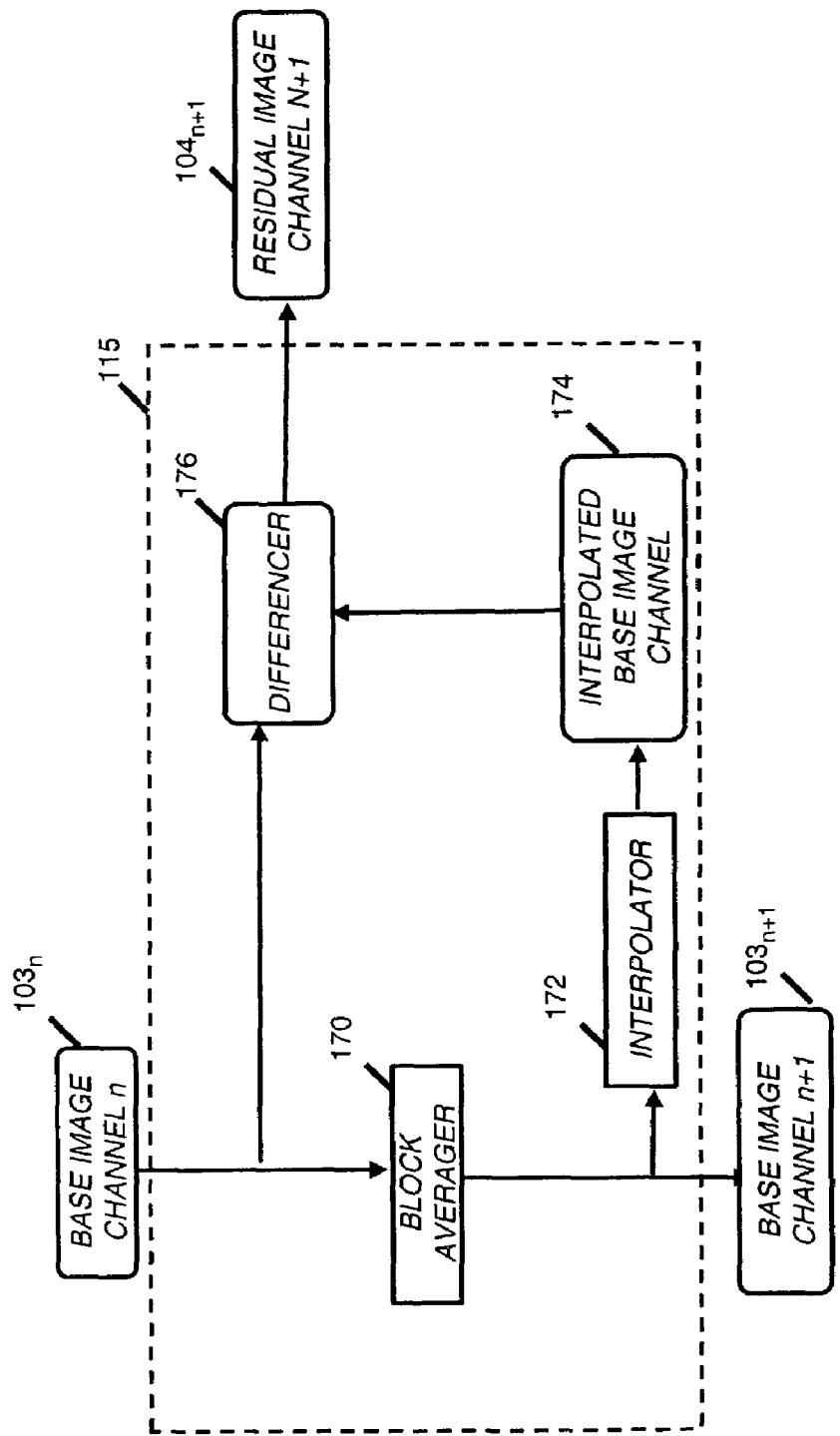
FIG. 8 is a block diagram of the pyramid level module shown in FIG. 7.

FIG. 8 fully illustrates the pyramid level module 115. The n$^{th}$ base image channel $103_n$ is input to a block averager 170 for producing the n+1$^{th}$ base image channel $103_{n+1}$. The block averager 170 produces a new digital image channel whereby each pixel value of the new digital image channel is formed by determining the mean pixel value of corresponding Q×Q non-overlapping blocks in the n$^{th}$ base image channel $103_n$. This technique for reducing the resolution of an image by an integer factor is well known in the art of image processing, as is applying a lowpass convolution filter followed by a sampling operation. The output of the block averager is the base image channel n+1 $103_{n+1}$, which is also an output of the pyramid level module 115. In the process of generating the reduced resolution base image channel $103_{n+1}$, highpass information is discarded. The residual signal contains the discarded highpass information such that the base image channel $103_{n+1}$ and the residual image channel $104_{n+1}$ can be combined to form the base image channel $103_n$. To produce the residual image channel $104_{n+1}$ the base image channel $103_{n+1}$ output from the block averager 170 is passed to an interpolator 172 for interpolation by the factor Q. Preferably, the interpolator 172 performs a standard bilinear interpolation by a factor of two. The preferred bilinear interpolation is such that the phase of the interpolated image is that same as that of the base image channel $103_n$. Such bilinear interpolation is commonly known and practiced in the art of image processing and will not be further discussed. The output of the interpolator 172 is the interpolated base image channel 174. The interpolated base image channel 174 is input to the differencer 176. The differencer 176 calculates the residual image channel $104_{n+1}$ by subtracting the interpolated base image channel 174 from the base image channel $103_n$, according to the equation:

$$r(x,y)=b(x,y)-bi(x,y) \qquad (17)$$

where:

r(x,y) represents the value of the pixel of the residual image channel $104_{n+1}$ at the (x,y) location.

b(x,y) represents the value of the nth base image channel $103_n$ at the (x,y) location.

bi(x,y) represents the value of the interpolated base image channel 174 at the (x,y) location.

From the previous equation, it is easy to see that the base digital image $103_n$ can be formed from the base digital image $103_{n+1}$ and the residual digital image $104_{n+1}$ through a reconstruction process. The process includes the steps of interpolating the base digital image $103_{n+1}$, then adding the residual digital image $104_{n+1}$. By extension, the digital image channel 164 shown in FIG. 7 can be represented as a collection of residual digital images $104_{1-N}$ and one base digital image $103_N$. The perfect reconstruction of the digital image channel 164 is an iterative process where one base digital image and the corresponding residual image are used to create a higher resolution base digital image, which in turn is used with the next residual digital image to create an even higher resolution base digital image. In the preferred embodiment, N=8 pyramid levels are used in the pyramid representation. Perfect reconstruction of an image pyramid is well known.

Figure 9:
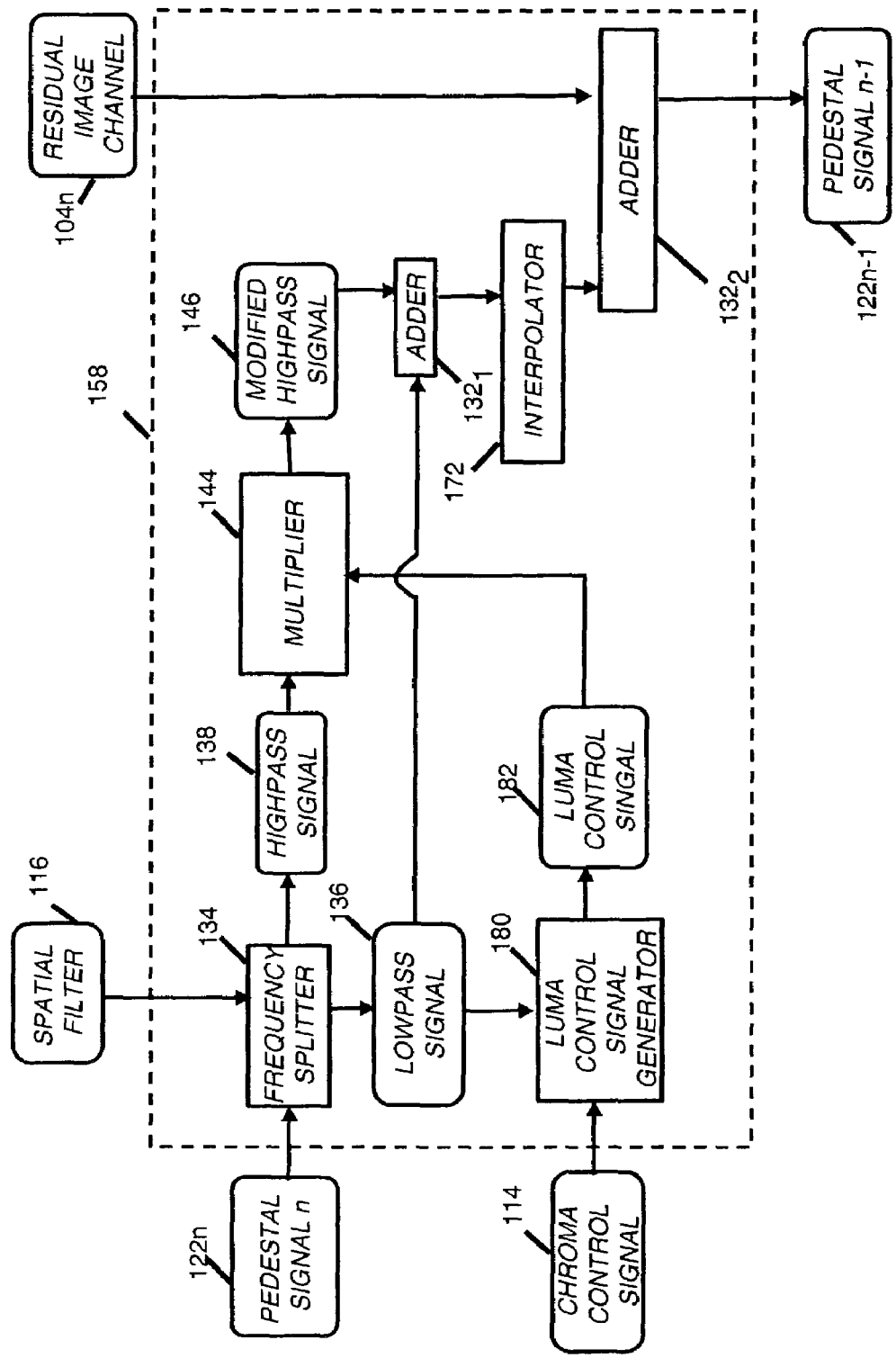
FIG. 9 is a block diagram of one iteration of the pedestal reconstructor shown in FIG. 6.

One iteration of the pedestal reconstructor 158 of FIG. 6 is shown in greater detail in FIG. 9. The pedestal reconstructor 158 generates a pedestal signal 122 by performing the reconstruction process with the modification that at each pyramid level, image texture is removed, or left out of the reconstruction. The iterative pedestal reconstructor inputs the pedestal signal $122_n$, which is the pedestal signal at resolution level n. For resolution level n=N (lowest resolution level represented in the image pyramid representation 108), the pedestal signal N $122_N$ is set equal to the lowest resolution base image channel $103_N$. The pedestal reconstruction module inputs the pedestal signal n $122_n$ and outputs a higher resolution pedestal signal $122_{n-1}$. The pedestal signal 122 of FIG. 6 is the highest resolution (final) pedestal signal $122_0$.

Referring again to FIG. 9, the pedestal signal n $122_n$ is input to a frequency splitter 134. The frequency splitter 134 applies a spatial filter 116 to the pedestal signal, generating the lowpass signal 136. The spatial filter 116 is lowpass in nature, attenuating any high frequency content in the pedestal signal $122_n$. The frequency splitter 134 also outputs a highpass signal 138 in the manner previously described (similar to Equation 11). The highpass signal 138 is calculated as the difference between the pedestal signal n $122_n$ and the lowpass signal 136.

The lowpass signal 136 and the chroma control signal 114 are input to the luma control signal generator 180 for generating the luma control signal 182. The operation of the luma control signal generator 180 will be described in more detail hereinbelow. The luma control signal 182 has a value near 1.0 corresponding to "edge" regions in luminance digital image 107, and a value near 0 for other regions, with intermediate values. The multiplier 144 multiplies the highpass signal 138 and the luma control signal 182, forming the modified highpass signal 146. The modified highpass signal is then added by an adder 132 to the lowpass signal 136, resulting in a signal that has the same pixel values as the pedestal signal $122_n$ in edge regions and that is smoothed in non-edge regions. The signal output from the adder $132_1$ is interpolated by a factor Q by the interpolator 172 and then added by a second adder $132_2$ to the residual image channel $104_n$, resulting in the next higher resolution pedestal signal $122_{n-1}$.

Figure 10:
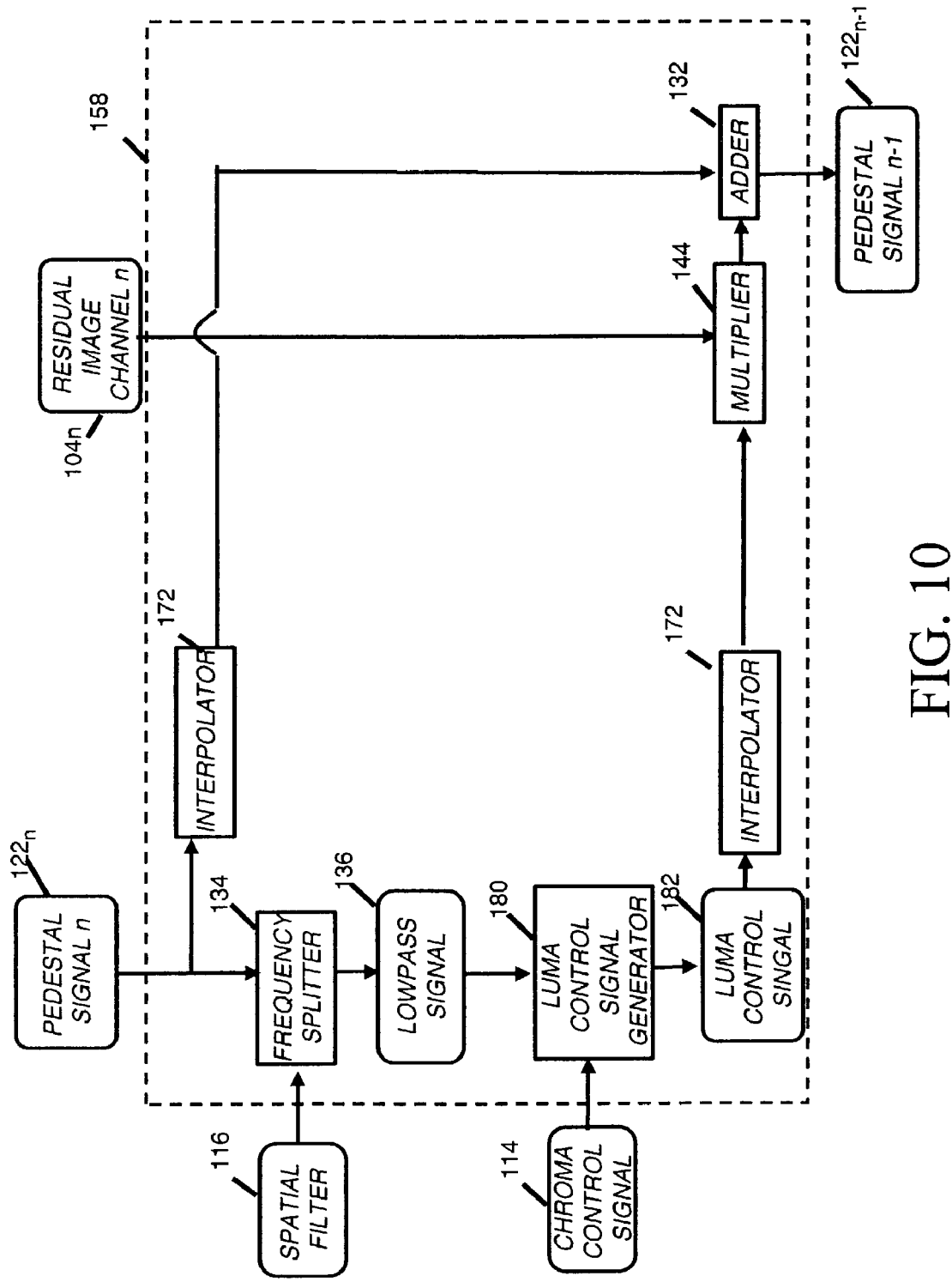
FIG. 10 is a block diagram of one iteration of an alternative pedestal reconstructor shown in FIG. 6.

An alternative of one iteration of the pedestal reconstructor 158 of FIG. 6 is shown in greater detail in FIG. 10. Referring again to FIG. 10, the pedestal signal n $122_n$ is input to a frequency splitter 134. The frequency splitter 134 applies a spatial filter 116 to the pedestal signal, generating the lowpass signal 136. The spatial filter 116 is lowpass in nature, attenuating any high frequency content in the pedestal signal $122_n$.

The lowpass signal 136 and the chroma control signal 114 are input to the luma control signal generator 180 for generating the luma control signal 182, in identical fashion as in regard to FIG. 9. Again, the luma control signal 182 has a value near 1.0 corresponding to "edge" regions in luminance digital image 107, and a value near 0 for other regions, with intermediate values.

The luma control signal 182 is interpolated by a factor Q by an interpolator 172, and multiplied by the residual image channel $104_n$ by a multiplier 144, resulting in a signal that is zero in non-edge regions and maintains the values of the residual image channel $104_n$ in edge regions. The resulting signal is added with an adder 132 to the signal resulting from interpolating with an interpolator 172 the pedestal signal n, forming the pedestal signal $122_{n-1}$. Thus, the pedestal signal $122_{n-1}$ is simply an interpolated version of the pedestal signal n, with the addition of residual image channel $104_n$ content in edge regions.

FIGS. 9 and 10 illustrate two different iterative pedestal level reconstructors 158 for creating a higher resolution pedestal signal 122 from a starting pedestal signal. By iterating either of these pedestal level reconstructors, a pedestal signal 122 can be generated from the pyramid image representation 108 of FIG. 6. In the preferred embodiment, the pyramid image representation 108 has 8 levels. In generating the pedestal signal 122, the reconstructor 158 shown in FIG. 9 is used to generate pedestal signals $122_7$ to $122_4$, and the reconstructor 158 shown in FIG. 10 is used to generate the remaining pedestal signals, including the final pedestal signal 122 output from the pedestal splitter 120 shown in FIG. 3.

Figure 11:
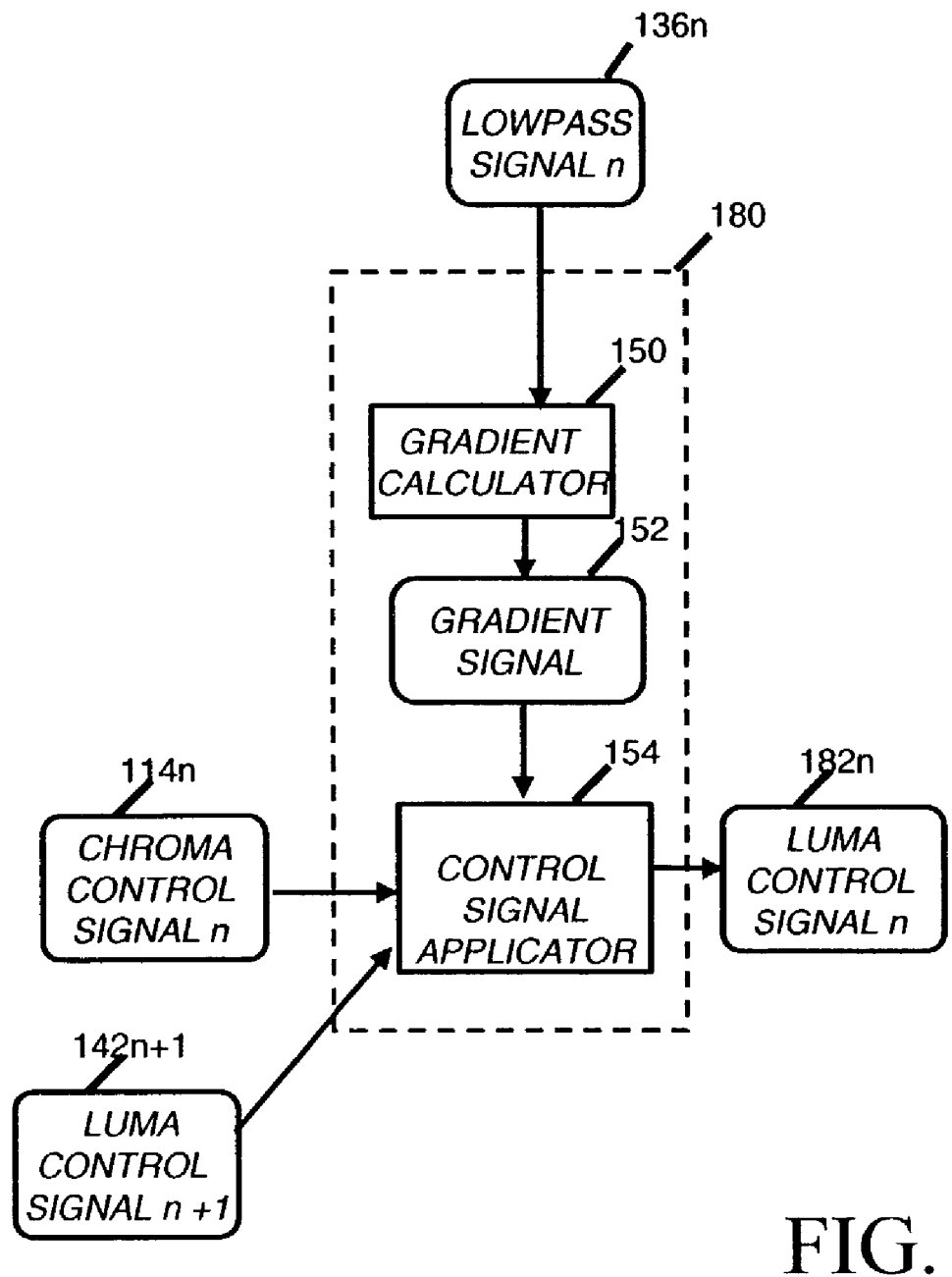
FIG. 11 is a block diagram of the luma control signal generator shown in FIGS. 9 and 10.

FIG. 11 illustrates the luma control signal generator 180 that is used to create the luma control signal 182 for use in generating the pedestal signal when reconstructing an image pyramid representation, as shown in FIGS. 9 and 10. The luma control signal generator 180 operates at each pyramid level in a very similar fashion to the luma control signal generator 140 that is used to create the pedestal signal 122 already described in regard to FIG. 5. In accordance with FIGS. 9 and 10, a luma control signal $182_n$ is generated for each of the resolution levels during the pedestal reconstruction.

First, the non-directional gradient G of the lowpass signal $136_n$ at resolution level n is calculated by the gradient calculator 150 and output as the gradient signal 152. This calculation has already been described.

The control signal applicator 154 inputs the gradient signal 152 the chroma control signal 114n, and optionally the luma control signal $182_{n+1}$ (the luma control signal previously calculated from the previous lower resolution) and produces the luma control signal $182_n$. The values of the luma control signal $182_n$ are in the range of 0 to 1, and are found by applying a gradient threshold that is dependent on both the value of the chroma control signal $114_n$ and the luma control signal $182_{n+1}$ to the gradient signal 152. The luma control signal $182_n$ has a value of 1.0 corresponding to "edge" regions and a value of 0.0 corresponding to "detail" regions in the original digital image and intermediate values for regions that are not easily classified as "edge" or "detail". In the preferred embodiment, a classification of "edge" can be attained more easily (i.e. the gradient signal requirement is lowered) in the luma control signal when the chrominance channels meet certain requirements (e.g. at least one blue pixel and a large variety of colors are represented.) In addition, the classification of "edge" is more difficult to attain (i.e. the gradient signal requirement is increased) in the luma control signal $182_n$ where the corresponding location in the previous resolution luma control signal $182_{n+1}$ was not classified as an "edge" (i.e. the pixel value was not 1.0). The operation of the control signal applicator 154 can be expressed as an equation:

$$Lc(x, y) = \begin{cases} 1 & \text{when} \quad G(x, y) < p \\ 0 & \text{when} \quad G(x, y) > 2p \\ 1.0 - \dfrac{G(x, y) - p}{p} & \text{otherwise} \end{cases} \quad (18)$$

where

Lc(x,y) is the value of the luma control signal 182 at the (x,y) location;

G(x,y) is the value of the gradient signal 152 at the (x,y) location;

p is a threshold that is dependent on the value of the chroma control signal 114 and the luma control signal n+1 182$_{n+1}$ and is preferably:

$$p(x, y) = \begin{cases} \max(0, f - Cv(x, y)) + h(g - Lo(xx, yy)) & \text{when} \quad Lo(xx, yy) < g \\ \max(0, f - Cv(x, y)) & \text{otherwise} \end{cases} \quad (19)$$

where:
f is an arbitrary constant, preferably 68;
h is an arbitrary constant, preferably 1.4;
g is an arbitrary constant, preferably 0.4; and
Lo(xx,yy) is the value of the luma control signal n+1 at the location (xx,yy) that corresponds to the location (x,y) in the current resolution level n.

When Q=2, the value of xx=(x−1/2)/2 for example. The value of the luma control signal Lo(xx,yy) must be found by interpolation (preferably bilinear interpolation) when either xx or yy is not an integer. All other variables have been previously defined.

Notice that the chroma control signal 114 is derived from the chrominance channels using an appropriate value of M (window size) such that the chroma control signal has an appropriate number of pixels. The luma control signal is derived from the chroma control signal 114. Therefore, the luma control signal is derived in part from the chroma control signal 114. In addition, the luma control signal 182$_n$ also has a dependence on a previously calculated low resolution version of the luma control signal 182$_{n+1}$. Those skilled in the art will recognize that the luma control signal 182$_n$ could be derived in part from any of the lower resolution versions of the luma control signal. In addition, the luma control signal 182$_n$ could also be derived from a chroma control signal at any level of resolution with appropriate re-sizing.

The present invention can be employed with any number of pyramid levels. Noise in images is generally a function of spatial resolution and is also more objectionable for the higher spatial resolution pyramid levels. The optimal number of pyramid levels depends on the texture removal goals of the digital imaging system designer and on the size of the digital images being processed. The preferred embodiment of the present invention uses 8 pyramid levels for effective texture and noise removal for digital images of size 1024 by 1536 pixels. For processing digital images of greater spatial resolution, such as 2048 by 3072 pixel, 9 pyramid levels are used. For processing digital images of lower spatial resolution, such as 512 by 768 pixels, 7 pyramid levels are used.

The method of the present invention can be performed in a digital camera or in a digital printer. An operator interface, such as the display device 50 and the input control device 60 shown in FIG. 1 can be used by an operator to identify a target color, for example by positioning a cursor on an area of a scene displayed on display device 50.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 display device
60 input control device
70 offline memory device
101 original digital image
102 enhanced digital image
103$_{1-N}$ base image channel
104$_{1-N}$ residual image channel
107 luminance digital image
108 image pyramid representation
109 chrominance digital image
112 chroma control signal generator
113 enhanced luminance digital image
114 chroma control signal
115$_{1-N}$ pyramid level module
116 spatial filter
120 pedestal splitter
122$_{0-N}$ pedestal signal
124 tone scale function applicator
126 modified pedestal signal
128 texture generator
130 texture signal
132 adder
134 frequency splitter
136 lowpass signal
138 highpass signal
140 luma control signal generator
142 luma control signal
144 multiplier
146 modified highpass signal
150 gradient calculator
152 gradient signal
154 control signal applicator
156 pyramid constructor
158 pedestal reconstructor
164 digital image channel
170 block averager
172 interpolator
174 interpolated base image channel
176 differencer
180 luma control signal generator
182 luma control signal
203 tone scale function
210 LCC conversion module
220 RGB conversion module
230 tone scale function generator
240 luminance enhancer

What is claimed is:

1. An improved method of processing a color digital image having a luminance channel and one or more chrominance channels, that includes the steps of separating the luminance channel into a first signal and a second signal, wherein the first and second signals include different spatial frequency information, wherein the improvement comprises employing one or more of the chrominance channels to separate the luminance channel into the first and second signals.

2. The method of claim 1 wherein the method is performed in a digital camera.

3. The method of claim 1 wherein the method is performed in a digital printer.

4. An improved method of processing a color digital image having a luminance channel and one or more chrominance channels to improve the tone scale characteristics of the image, that includes the steps of generating a pedestal signal containing mainly low frequency modulation from the luminance channel; and a texture signal by subtracting the pedestal signal from the luminance channel, modifying the pedestal signal with a tone scale function and recombining the modified pedestal signal with the texture signal to produce an enhanced luminance channel, wherein the improvement comprises employing the chrominance channels to generate the pedestal signal.

5. A method of processing a color digital image having a luminance channel and one or more chrominance channels to improve the tone scale characteristics of the image, comprising the steps of:
   a) producing a control signal from the one or more chrominance channels;
   b) generating a pedestal signal containing mainly low frequency modulation from the luminance channel, a spatial filter, and the control signal; and
   c) producing a texture signal by subtracting the pedestal signal from the luminance channel.

6. A method of processing a color digital image having a luminance channel and one or more chrominance channels to improve the tone scale characteristics of the image, comprising the steps of:
   a) producing a control signal from the one or more chrominance channels;
   b) generating a pedestal signal containing mainly low frequency modulation by filtering the luminance channel with a spatial filter, whereby the operation of the spatial filter is modulated by the control signal; and
   c) producing a texture signal by subtracting the pedestal signal from the luminance channel.

7. The method claimed in claim 6, further comprising the steps of
   d) applying a tone scale function to the pedestal signal to produce a modified pedestal signal;
   e) combining the modified pedestal signal with the texture signal to produce an enhanced luminance signal; and
   f) combining the chrominance channel with the enhanced luminance channel to produce a processed color digital image.

8. The method claimed in claim 7, wherein the step of producing a control signal from the one or more chrominance channels comprises the steps of:
   a1) calculating a gradient signal from the luminance channel;
   a2) determining a gradient threshold value from the chrominance channels; and
   a3) producing the control signal by applying the gradient threshold value to the gradient signal.

9. The method claimed in claim 8, wherein the gradient threshold value is determined by calculating a variance of the chrominance channels.

10. The method claimed in claim 8, wherein the gradient threshold value is determined as a function of the distance between values from the chrominance channels to a target color.

11. The method claimed in claim 10, wherein the target color is blue sky.

12. The method claimed in claim 8, wherein the step of generating the pedestal signal includes the steps of:
   b1) forming an image pyramid representation of the luminance channel having a base image and a plurality of residual images;
   b2) spatially filtering the base image and/or the residual images; and
   b3) combining the spatially filtered image pyramid representation to generate the pedestal image.

13. The method claimed in claim 8, wherein the gradient signal is calculated from one or more low resolution versions of the luminance channel.

14. A system for processing a digital image having a luminance channel and one or more chrominance channels to improve the tone scale characteristics of the image, comprising:
   a) means for producing a control signal from the one or more chrominance channels;
   b) means for generating a pedestal signal containing mainly low frequency modulation by filtering the luminance channel with a spatial filter, whereby the operation of the spatial filter is modulated by the control signal;
   c) means for producing a texture signal by subtracting the pedestal signal from the luminance channel;
   d) means for applying a tone scale function to the pedestal signal to produce a modified pedestal signal;
   e) means for combining the modified pedestal signal with the texture signal to produce an enhanced luminance signal; and
   f) means for combining the chrominance channel with the enhanced luminance channel to produce a processed color digital image.

15. The method claimed in claim 14, wherein the step of producing a control signal from the one or more chrominance channels comprises the steps of:
   a1) calculating a gradient signal from the luminance channel;
   a2) determining a gradient threshold value from the chrominance channels; and
   a3) producing the control signal by applying the gradient threshold value to the gradient signal.

16. The system claimed in claim 15, wherein the means for determining a gradient threshold value employs a function of the distance between values from the chrominance channels to a target color.

17. The system claimed in claim 16, wherein the target color is blue sky.

18. The system claimed in claim 16, further comprising an operator interface for identifying a target color.

19. The system claimed in claim 18, wherein the operator interface comprises a display and means for indicating a target color in the display.

20. The system claimed in claim 19, wherein the display displays the image to be processed, and includes means for indicating a particular location in the image having the target color.

* * * * *